United States Patent

Decker

Patent Number: 5,156,433
Date of Patent: Oct. 20, 1992

[54] COMBINATION WINDSHIELD-SCREEN DASHBOARD-MAT DEVICE

[76] Inventor: Harry L. Decker, Box 3673, Page, Ariz. 86040

[21] Appl. No.: 797,230

[22] Filed: Nov. 25, 1991

Related U.S. Application Data

[63] Continuation-in-part of Ser. No. 636,708, Jan. 2, 1991, Pat. No. 5,100,194.

[51] Int. Cl.$^5$ .............................................. B60J 3/02
[52] U.S. Cl. .................................. 296/97.7; 296/97.8; 160/370.2
[58] Field of Search ............. 296/97.7, 97.8, 97.9, 296/37.12; 160/370.2

[56] References Cited

U.S. PATENT DOCUMENTS

| | | | |
|---|---|---|---|
| 2,207,224 | 7/1940 | Meares | 296/97.7 |
| 2,410,171 | 11/1946 | Le Lande | 296/97 |
| 2,711,923 | 6/1955 | Parks | 296/97 |
| 2,791,272 | 5/1957 | Stehlik | 160/290 |
| 2,813,749 | 11/1957 | Wetig | 296/97 |
| 3,003,812 | 10/1961 | Haugland | 296/97 |
| 3,022,109 | 2/1962 | Hauskama | 296/97 |
| 3,183,033 | 5/1965 | Stulbach | 296/97 |
| 4,105,246 | 8/1978 | Trumbull | 296/97 |
| 4,560,245 | 12/1985 | Sarver | 296/97.7 |
| 4,708,388 | 11/1987 | Zacharczuk | 296/97.7 |

*Primary Examiner*—Robert R. Song
*Attorney, Agent, or Firm*—Antonio R. Durando; Harry M. Weiss

[57] ABSTRACT

A multiple-panel multipurpose device that is installed on the dashboard of a vehicle to form, in its closed position, a protective layer during the operation of the vehicle. When the vehicle is at rest, the panels can be extended by a simple maneuver to cover virtually the entire windshield and protect the interior of the vehicle from harmful sun light. When the geometry of the dashboard permits, some of the space between the bottom panel of the device and the top of the dashboard can be utilized to provide additional utility functions or compartments for accessories. The invention is suitable for adaptation to any existing vehicle, including boats and airplanes.

19 Claims, 1 Drawing Sheet

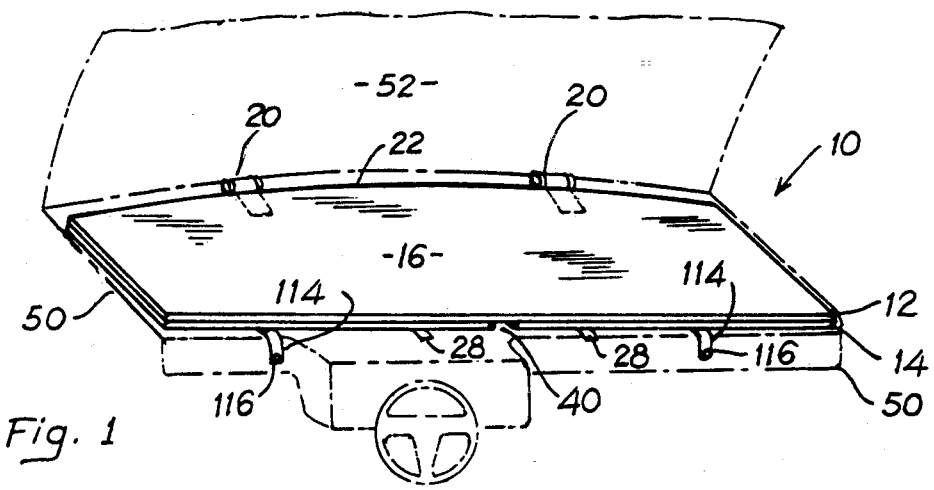
Fig. 1
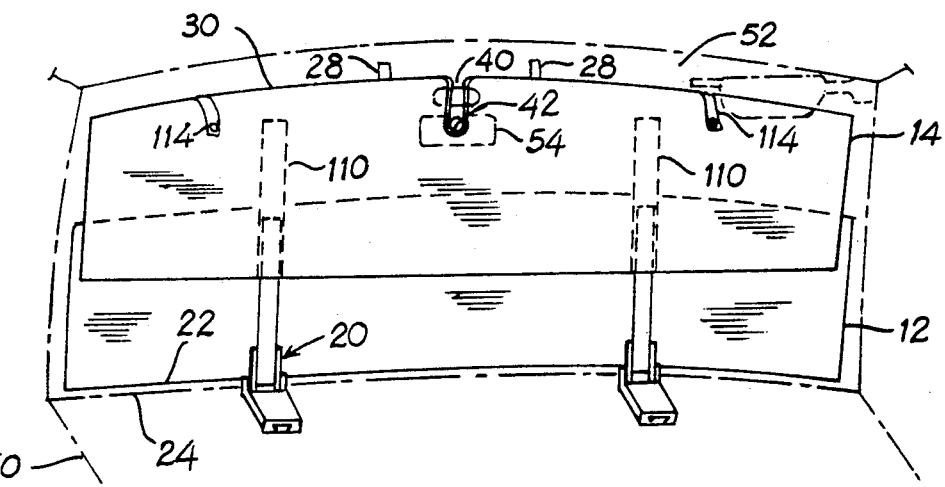
Fig. 2
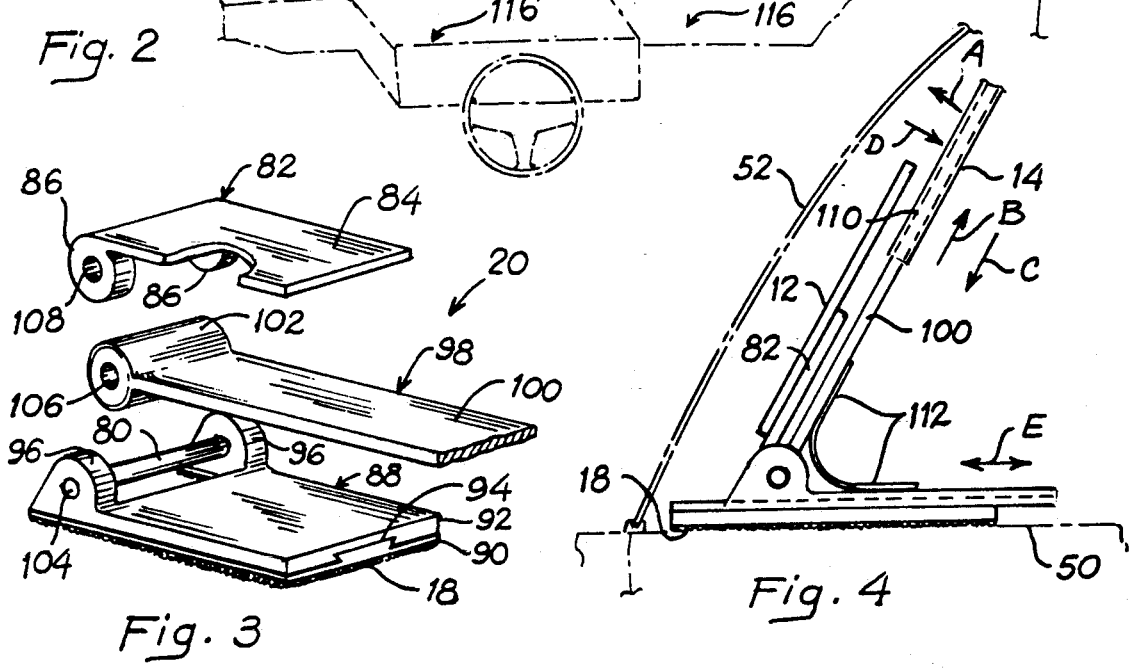
Fig. 3
Fig. 4

COMBINATION WINDSHIELD-SCREEN DASHBOARD-MAT DEVICE

RELATED APPLICATIONS

This application is a continuation-in-part application of copending U.S. Application Ser. No. 07/636,708 by the same inventor, filed on Jan. 2, 1991, now U.S. Pat. No. 5,100,194, and entitled Combination Windshield-Screen Dashboard-Mat Device.

BACKGROUND OF THE INVENTION

1. Field of the Invention

This invention is related in general to the fields of sun screens and automotive accessories. In particular, the invention provides a motor vehicle dashboard mat that also fulfills the function of windshield screen and a variety of other accessory uses.

2. Description of the Prior Art

People have been trying to protect the interior of their vehicles from scorching sunlight and the discomfort and damage that it may cause ever since carriages have existed. Protection has come in many forms, ranging from filtering coatings on glass panels to fashionable drapery hanging from the interior of the passenger compartment. More recently, protection has consisted mostly of removable devices placed inside the windshield when the vehicle is at rest, such as the popular accordion-type sun visor frequently seen in parking lots on sunny days.

For example, U.S. Pat. No. 2,410,171 to Le Lande (1946) describes a glare shield mounted on the dashboard of a vehicle to protect the driver from excessive direct sunlight. It consists of a solid piece of anti-glare material only large enough to cover the lower portion of the windshield in front of the driver, so that the view above it remains unobstructed. Hinged at the bottom of the windshield, this device can be flipped up and down, as required by light conditions, but it cannot be extended to cover the entire glass for protection of the vehicle's interior.

U.S. Pat. No. 2,711,923 to Parks (1955) shows an extendable shade that can be mounted on the bottom of a windshield or the top of a dashboard through suction cups attached to its frame. The position of the shade can be adjusted by rotating its frame with respect to the cups to provide the necessary degree of shielding from the sun. In one model, the patent also describes an extension that can be attached to the frame and secured in place by fastening snaps to extend the shield to the top of the glass. This device is intended for protection from light while driving only and, therefore, it is limited to the driver's side of the vehicle.

In U.S. Pat. No. 2,791,272 (1957), Stehlik teaches the construction of an adjustable anti-glare shade that consists of flexible material stored in a roller mounted on the dashboard. The material can be rolled out to the desired length and secured in its extended position by fastening it to two support arms attached to the ends of the roller. Each arm can pivot independently, thus enabling a user to adjust the position of the shade to best screen the light from outside as needed according to variable driving conditions.

U.S. Pat. No. 2,813,749 to Wetig (1957) illustrates another glare shield to protect the driver of a vehicle from direct sun light. It consists of an appropriately sized, rigid screen hinged on a base which is mounted on the dashboard in front of the steering wheel. The screen is normally kept in a flat position. When needed, the driver can raise it by releasing a spring in the unit that pulls the screen to a generally vertical position directly in front of his or her eyes. This device is limited in the scope of coverage and it is not adjustable.

U.S. Pat. No. 3,003,812 to Haugland (1961) describes yet another anti-glare apparatus of pleated construction that collapses into a compact unit in front of the driver and can be extended and adjusted to an optimal position when in use. Each side of the screen is independent for more flexibility. In addition, by the relative adjustment of the two sides, the pleats of the anti-glare material can be positioned to maximize visibility while countering the source of glare. In principle, this invention has the same functional characteristics of the Stehlik patent, but uses a folded screen rather than a rolled one.

In U.S. Pat. No. 3,022,109 (1962), Hauskama discloses a shield specifically designed to protect a driver from the glare received through the rear view mirror of a vehicle. A supporting bracket is mounted on the dashboard and the shield is hinged on it so that it can be positioned to intercept the glare when needed. The scope of the invention is limited to this use and it could not be applied to protect from light in front of the driver.

U.S. Pat. No. 3,183,033 to Stulbach (1965) illustrates another motor vehicle anti-glare shield consisting of a pair of flexible sheets stored in rollers in a cylindrical casing mounted on the dashboard. A shield is formed by extracting either one or both of the sheets from the casing to reach and be fastened to receiving retainers above the windshield. The two anti-glare sheets are pigmented in different colors and with increasing intensity towards the top of the screen, so that the user is afforded a variety of choices.

Finally, U.S. Pat. No. 4,105 246 to Trumbull (1978) discloses a multi-purpose dashboard attachment that can be used to protect from glare as well as to provide a utility unit. It consists of a movable panel hinged on top of a drawer in a single unit for incorporation in the dashboard on the driver's side of the vehicle. By raising the panel toward the windshield, the user can aid the action of the defroster as well as create a shield against glare and heat. At the same time, the drawer provides a means for storing and, when extracted, for supporting small articles. The apparatus does not appear to be suitable for retrofit applications.

These devices are mainly designed to protect a driver from glare while operating a vehicle and their geometries permit only a limited coverage of the windshield area. They also tend to require the use of several pieces of hardware for attachment to the interior of the vehicle, which generally do not conform with the style of the vehicle's interior and detract from its aesthetic value. In addition, these devices generally require the use of two hands to place them in service and sometime require cumbersome adjustments that may affect the safety of their use. Therefore, there still exists a need for a simple and aesthetically attractive device that can be put in service with minimal work to cover the entire windshield area and that can further be adapted for use in combination with accessories for specific utility purposes.

BRIEF SUMMARY OF THE INVENTION

One objective of this invention is the development of a windshield screen that can be put in service with a simple and safe operation.

Another objective of the invention is an apparatus that covers the entire windshield area for maximum protection of the vehicle's interior from sun light.

Another goal of the invention is an apparatus that provides a clear and uninterrupted surface available for advertisements when the screen is in use.

A further goal of the invention is a device that, when not used as a screen, provides an attractive dashboard mat with the same protective function of similar apparatus currently available as an automotive accessory.

Another objective is a screen that will not warp over a period of time when subjected to the intense heat of direct sunlight.

A further objective is a device that is locked in place on the dashboard of a motor vehicle, so as to avoid the possibility of accidental unfolding and obstruction of a driver's view during the operation of the motor vehicle.

Yet another goal of the invention is a unit that can be adapted to provide additional utility functions depending on the dashboard geometry of the vehicle to which it is attached, such as a compartment for storage or similar applications.

A final objective is the easy and economical manufacture of the case according to the above stated criteria. This is achieved by using commercially available components and materials, modified only to the extent necessary to fit the requirements of the invention.

Therefore, according to these and other objectives, the present invention describes a multiple-panel multi-purpose device that is installed on the dashboard of a vehicle to form, in its closed position, a protective layer during the operation of the vehicle. When the vehicle is at rest, the panels can be extended by a simple maneuver to cover virtually the entire windshield and protect the interior of the vehicle from harmful sun light. When the geometry of the dashboard permits, some of the space between the bottom panel of the device and the top of the dashboard can be utilized to provide additional utility functions or compartments for accessories. The invention is suitable for adaptation to any existing vehicle, including boats and airplanes.

Various other purposes and advantages of the invention will become clear from its description in the specifications that follow and from the novel features particularly pointed out in the appended claims. Therefore, to the accomplishment of the objectives described above, this invention consists of the features hereinafter illustrated in the drawings, fully described in the detailed description of the preferred embodiments an particularly pointed out in the claims. However, such drawings and description disclose only some of the various ways in which the invention may be practiced.

BRIEF DESCRIPTION OF THE DRAWINGS

FIG. 1 is a perspective view of the windshield-screen dashboard-mat apparatus of this invention, seen in its closed position mounted on the dashboard of a vehicle.

FIG. 2 is perspective view of the same apparatus of FIG. 1 after it has been opened to form a protective screen over the vehicle's windshield.

FIG. 3 is a detailed exploded perspective view of a hinge designed to provide slidable support for the panel extending to form a windshield screen.

FIG. 4 is lateral view of the hinge of FIG. 3 mounted on the apparatus of FIG. 1 showing the opening and extension of the screen panels to form a windshield screen.

DETAILED DESCRIPTION OF THE INVENTION

This invention consists of the application of simple mechanical principles in combination with known structural components to achieve a practical and economical design for an improved windshield screen. The main point of the invention lies in the recognition of the fact that the structure of an extendable multi-panel screen can also be used to provide a protective dashboard mat and, if desired, to create utility compartments out of otherwise unused spaces and a very visible surface that can be effectively utilized for advertising. Thus, the screen of this invention is generally shaped like a dashboard and is hinged to it near the bottom edge of the windshield. It consists of two or more similarly shaped sections that rest on top of each other on the dashboard and can be opened to form a screen covering the windshield. In order to cover the windshield, the sections are pulled upward by pivoting around the hinges and extended upwards over fixed tracks or slide guides so as to cover most of the windshield. As in the case of fold-up (accordion) type of screens, this screen is then left to rest against the rear view mirror or the sun visors. The invention is suitable for installment either as a factory option or as an accessory for after-market retrofitting.

Referring now to the drawings, wherein like parts are designated throughout with like numerals and symbols, FIG. 1 illustrates in perspective view the windshield-screen 10 of this invention as it appears mounted on a vehicle's dashboard 50 in its mat configuration before it is folded open. Very similar in size and exterior appearance to a standard dashboard mat, the apparatus of this invention consists of at least two rigid panels, seen in extended position as 12 and 14 in FIG. 2, which lie stacked on top of each other and form a single top surface 16 when the device is in its closed position. The top panel 12 is shaped to conform to the top geometry of the vehicle's dashboard and it is pivotally fastened to it by a multiplicity of hinges 20 connecting the front edge 22 of the panel to the front portion 24 of the dashboard. Each hinge 20 is permanently attached to the top panel 12 and to the dashboard 50 by fastening means 18 (shown in the hinge embodiment of FIG. 3), such as fiber-loop components (Velcro ® strips) cooperatively placed on the bottom of the hinge and on the dashboard, adhesive tape or other equivalent devices. The bottom panel 14 is slideably connected to the device, either through the top panel 12 or the hinge 20, so that it can extend outwardly when the two panels are not stacked together. As described in my companion application, a typical connection consists of pairs of tracks affixed to each panel in slidable cooperation with each other, allowing the bottom panel to freely slide in and out of its retracted position by simply pulling on apposite tabs 28 affixed to its back edge 30. Any hinge of the type available from standard hardware is suitable to practice this invention so long as it can be securely fastened to one of its panels and to the dashboard. Similarly, the invention can be practiced in equivalent fashion regardless of which panel is attached to the hinge (and therefore to the dashboard). The important feature is that one of the panels is so pivotally attached and the other (or others, in case more are needed to cover the area of the windshield) is slidably connected to the first one so that it can be extended to form the screen.

One of the objectives of this specification is to disclose a novel and more versatile connection that allows more flexibility of use than described in my companion application. FIG. 3 illustrates a new hinge 20, in exploded view, that I designed specifically to improve the functioning and utilization of the windshield screen of this invention. The hinge 20 comprises three separate components, which are all pivotally connected through a common axle 80. The top component 82 consists of a plate 84 (shown partially cut-out) integrally connected to two donut-shaped wheels 86 pivotally mounted on the axle 80. The bottom component 88 comprises a bottom plate 90 and a top plate 92, slidably connected by a longitudinal dovetail joint 94 cut along the entire length of the component, so that the two plates can slide with respect to one another along their longitudinal axes while remaining cooperatively engaged. The top plate 92 includes a support frame 96 for the axle 80, which provides the structure for joining all components. The bottom surface of the bottom plate 90 is equipped with fastening means 18, such as fiber-loop or equivalent fasteners, for affixing the hinge 20 to the front of the dashboard 50, as illustrated in FIG. 2. The intermediate component 98 consists of a blade 100 integrally attached to a support cylinder 102 sized to fit longitudinally between the wheels 86 and the support frame 96 in perfect alignment for assembling the three components by inserting the axle 80 through the coaxial holes 104, 108 and 106 in the frame 96, the donut wheels 86 and the cylinder 102, respectively.

The blade 100 is designed to fit into a matching sheath 110 incorporated into the bottom panel 14; therefore, its length is approximately the same (or slightly less) as the depth of the panel, so that it is almost fully inserted in the sheath when the panel is retracted in its closed position. In the preferred embodiment of the invention, the top of the plate 84 is rigidly fastened to the bottom side of the front edge 22 of the top panel 12, such as by the use of adhesives, so that the panel is hinged to the dashboard and free to pivot to an open position by the rotation of the top component 82 around the axle 80. As shown in FIG. 4, the combination of two or more hinges 20 provides a support structure for the entire windshield screen assembly. The bottom plate 90 of the bottom component 88 is fixedly attached to the front of the dashboard 50, as mentioned above. Thus, the bottom panel 14, which is slidably connected to the intermediate component 98 by the snug engagement of the blade 100 into the sheath 110 of the panel, and the top panel 12, which is attached to the top component 82 of the hinge, as indicated above, are both independently free to rotate to an upward open position by pivoting around the hinge's axle 80. The snug fit between the blade 100 and its corresponding sheath 110 is designed to require the application of slight force to cause the sliding movement of the panel, so that it remains in its approximately vertical extended position when opened, the force of gravity not being sufficient to cause it to retract closed. As further detailed below, I found that the friction between a blade made of either plastic or wood and a closely-fitting sheath made of laminated cardboard is sufficient to prevent the collapse of the panel from a vertical position.

Thus, a sturdy assembly is created for the repeated opening and closing of both panels and for the repeated extension and retraction of the bottom panel to alternatively form a windshield screen or a dashboard mat. In its extended position, the panel 14 reaches its maximum height to cover most of the vehicle's windshield 52 and provide maximum protection from sun light. A special opening 40 is provided in the back edge of the bottom panel 14 to accommodate the post of the rear-view mirror 54 typically protruding inward from the upper portion of the windshield. A molding 42 of resilient protective material, such as plastic or rubber, may be utilized to line the opening 40 in order to protect it from damage and minimize wear. The combination of extended panels 12 and 14 is kept from folding to a closed position by the mirror 54 or by the use of one or both sun visors 56 turned down to overlap the upper edge of the screen. Finally, as explained above, the extended panel 14 is prevented from collapsing into its retracted position by the friction in the blade/sheath system 20 (or any equivalent track system that may be used), which must be sufficiently tight to require some force to cause the relative sliding of its components.

In use, the apparatus described above normally rests in the position illustrated in FIG. 1, firmly attached to the vehicle's dashboard by appropriate fastening devices connecting the dashboard to the hinges 20, as detailed above. The top surface 16 of the device (which corresponds to the top surface of the top panel 12) can be utilized for any of the normal applications for which dashboard tops are employed. It may be covered with plush-looking fiber or with anti-glare material. In view of the fact that it becomes visible from the outside when the screen is up, the top surface can be used as well for carrying advertising or other messages for publication. If a set of hinges 20 is used to implement the invention and the sheaths 110 corresponding to the blades 100 are incorporated into the panel 14, the top surface of both panels remains clear of any hardware and provides a plain surface that becomes clearly visible to passersby when the screen is open. Thus, the top surface of both panels can be used for effective and inexpensive advertising. Because of their exposure to sunlight, the panels could even be used to house photovoltaic cells connected to the vehicle's battery in order to maintain its charge during prolonged idle periods.

When the vehicle is parked, the apparatus of the invention can be transformed quickly and easily into a windshield screen by pulling one of the tabs 28 in the direction of arrow A in FIG. 4, so as to cause both panels to swing open in an upward direction. Then the tab is pulled up to extend the bottom panel 14 with a generally vertical motion to cover as much as possible of the interior of the windshield, as indicated by arrow B in FIG. 4. As mentioned above, the resulting screen is then kept open either by the presence of a rear-view mirror or by the use of the sun visors. The opposite steps, indicated by arrows C and D in FIG. 4, are followed in order to retract the screen and return the assembly to its dashboard mat configuration. In addition to the functions just described, the hinge 20 provides limited horizontal mobility to the screen assembly that enables a user to free the air passages of the vehicle's heating or air conditioning vents. As illustrated in FIG. 4, the dovetail joint 94 between the top plate 92 and the bottom plate 90 of the hinge's bottom component 88 makes it possible to slide the screen assembly back and forth along arrows E, thus clearing the vents for the free passage of air conditioning or defroster air to the windshield.

Another advantage derived from the use of the hinge 20 described in this application is that it provides a suitable piece of hardware for spring-loading the screen assembly to facilitate its opening over the windshield. By placing a spring 112 either compressively wound around the axle 80 or, as illustrated in FIG. 4, in compression between the top plate 92 and the blade 100, the hinge would provide a simple mechanism for partially raising the back portion of all panels of the invention from their substantially horizontal position, so that the process of completely raising the panels to their final screen position becomes easier and more functional for a user. Of course, in order to keep the screen assembly in a closed position, spring-loaded hinges would also require the addition of at least one strap 114 attached to the edge 30 of the bottom panel 14 for connection with fastening means 116 located on the dashboard of the vehicle and capable of releasable engagement with the strap.

While the embodiments shown in the figures feature the specific shapes therein described, the invention can obviously take other shapes with equivalent functionality and utility. In fact, any shapes for the various panels that retain the functional characteristics described above provide an acceptable apparatus to practice the invention. The number of panels and the hardware provided to open and close them can be varied in obvious ways without affecting the scope of this disclosure. For example, additional panels can be added, slidably connected to the other panels or to the hinge, to provide screen coverage for tall windshields, such in trucks and recreational vehicles; moreover, side panels could be incorporated for airplane use in order to also provide screens for the lateral windshields commonly found in cockpits. These panels could be mounted on hinges or on horizontal tracks attached to the bottom side of each pivotable panel, so that they could be extended outwardly when the apparatus is in its open position. If more than two pivotable panels are combined to provide additional screen surface to cover high windshields, they should be connected in obvious fashion according to the way herein described, so that they extend slidably to form a screen of the desired size. All the panels could include perforations corresponding to the location of loudspeakers in the dashboard to permit the unimpaired use of audio equipment. As described in my companion application, a fixed bottom panel (not shown in the figures) can be added to provide a rigid structure to support the screen assembly over the dashboard. If such bottom panel is used in an embodiment using the hinge 20 described above, it is attached to the top plate of the bottom component of the hinge, thus becoming a non-pivotable integral part of the device capable only of sliding back and forth with entire assembly along the dovetail joints of the hinges.

Similarly, a variety of compartments and accessories can be added by one skilled in the art to fit the particular characteristics of specific dashboards. For instance, if a fixed bottom panel were used, that panel could become an integral part of the dashboard manufactured at the factory, and the entire multi-panel assembly could assume a split-level geometry to conform to the contour of the dashboard. This could also be achieved with retrofit apparatus by forming the panels of the invention with resin material, such as fiberglass, to conform to the shape of the dashboard.

The windshield screen of this invention is sized to fold into a unit approximating the area of the top surface of the dashboard in the vehicle for which it is used, but the same functional principles can be applied to units of different dimensions, so long as practical for the vehicle at hand. It has been found that reinforced cardboard covered with paper, vinyl or fabric, of the type normally used in the construction of dashboard mats, is particularly suitable for the manufacture of the various structural components of the invention because of its strength and relatively low cost. In particular, I discovered that the lamination of multiple layers of corrugated cardboard, of the type normally referred to as corrugated E-flute, provides a very durable flexible material for the construction of the panels of the invention. Because of the interstices between corrugations, E-flute material is highly insulating and light, and therefore ideal for the application of this invention. In the preferred embodiment, the top panel 12 consists of two layers of corrugated E-flute material with the corrugations at 90-degree bias, glued together with temperature resistant adhesive, such as the product sold by The 3-M Corporation of Saint Paul, Minn., under the trademark "Super 77." The bias provides the strength required for flexibility and resilience, so that the panel does not sag under its own weight or warp as a result of exposure to temperature fluctuations and sunlight. Since corrugated E-flute material is available in sheets that have a rough side and a finished side, I attach the two layers by their rough side, which improves their adhesion and leaves the finished side on the outside for better esthetic effect. I then either use the finished side of the top surface 16 to carry printed information or I cover it with matting material with a high ultraviolet resistance rating, such as the polypropylene face fiber product sold under the trademark "Ozite" by the Ozite Corporation. I also construct the bottom layer 14 on the preferred embodiment by gluing together three layers of corrugated E-flute material, wherein the intermediate layer is cut to provide the space that forms the sheaths 110 for the blades 100 of the hinges. The outside layers are glued to each side of the intermediate layer at 90-degree bias, as well. Thus, each sheath (corresponding to a blade of a hinge affixed to the dashboard) is completely enclosed within the body of the panel. I found that blades mad of kiln-dried pine wood, of the type used to manufacture rulers, have excellent wear and friction characteristics for use with sheaths made with corrugated cardboard, as detailed above. Thin layers of wood can also be used in lieu of cardboard to make the screen panels, particularly to create the supporting bottom panel, if one is used. Any durable material would be equivalently adequate and acceptable to practice the invention. Similarly, common hardware could be used instead of the hinge 20 described herein.

It is anticipated that this invention, as herein disclosed, can be used in equivalent fashion to provide a windshield-screen backdash-mat device to protect the back window area of motor vehicles. Of course, the device would then be adapted to cover the vehicle's backdash and back windshield instead of the dashboard and front windshield, as described in detail here, but the same functional relationship of the various components would apply in a way that would be obvious to one skilled in the art.

Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims, so as to embrace any and all equivalent apparatus and methods.

I claim:

1. A combination windshield-screen dashboard-mat device for protecting the interior of a vehicle from damage caused by sun light exposure, comprising:

(a) a top panel shaped to conform to the top geometry of the vehicle's dashboard;

(b) hinge means for pivotally fastening said top panel to said dashboard, said top panel having a closed position wherein it rests substantially horizontally on said dashboard and having an open position wherein it rests upright against the windshield of the vehicle;

(c) track means positioned below said top panel and extending outwardly with respect to said top panel and said dashboard; and (d) one bottom panel shaped substantially like said top panel, wherein said bottom panel is sandwiched between said top panel and said dashboard in its closed position and is slidably attached to said track means so that it can extend outwardly and upwardly when said top panel is pivoted to its open position, and wherein the back edge of said bottom panel features an opening to accommodate the post of the rear-view mirror typically protruding inward from the upper portion of said windshield.

2. The device described in claim 1, wherein said hinge means for pivotally fastening said top panel to said dashboard consists of at least two hinges, each consisting of three separate components pivotally connected to one another through a common axle and comprising the following structure:

a top component consisting of a plate for attachment to said top panel and integrally connected to two donut-shaped wheels pivotally mounted on an axle;

a bottom component comprising a bottom plate and a top plate slidably connected by a longitudinal dovetail joint cut along the entire length of said bottom component, so that the two plates can slide with respect to one another along their longitudinal axes while remaining cooperatively engaged; wherein said top plate includes a support frame for said axle, which provides the structure for joining all three components; and wherein the bottom surface of said bottom plate is equipped with fastening means for affixing the hinge to the front of said dashboard; and an intermediate component consisting of a blade integrally attached to a support cylinder sized to fit longitudinally between said donut-shaped wheels and said support frame in perfect alignment for assembling said three components by inserting said axle through coaxial holes in said frame, wheels and cylinder;

wherein said blade is designed to fit into a matching sheath incorporated into said bottom panel, thus providing said track means, so that it is almost fully inserted in the sheath when the panel is retracted in its closed position.

3. The device described in claim 2, further comprising spring-loaded means in said hinge for partially raising the back portion of all panels of the invention from their substantially horizontal position, so that the process of completely raising said panels to their final screen position becomes easier and more functional for a user.

4. The device described in claim 3, wherein said spring-loaded means consists of a spring compressively wound around said axle.

5. The device described in claim 3, wherein said spring-loaded means consists of a spring in compression between the top plate of said bottom component and the blade of said intermediate component.

6. The device described in claim 3, further comprising means for securely connecting said bottom panel with the dashboard of the vehicle in order to keep the screen assembly in closed position.

7. The device described in claim 6, wherein said means for securely connecting said bottom panel with the dashboard of the vehicle consists of at least one strap attached to the back edge of said panel and of fastening means affixed to said dashboard and capable of releasable engagement with said strap.

8. The device described in claim 1, further comprising a molding of resilient protective material lining said opening provided in the bottom panel to accommodate the post of the rear-view mirror of the vehicle.

9. The device described in claim 1, wherein said top panel and said bottom panel comprise multiple layers of corrugated cardboard material with the corrugations at 90-degree bias, glued together with temperature resistant adhesive.

10. The device described in claim 2, wherein said top panel consists of two layers of corrugated cardboard material with the corrugations at 90-degree bias, glued together with temperature resistant adhesive, and wherein said bottom layer consists of three layers of corrugated cardboard material, the intermediate layer being cut to provide the space that forms the sheaths for the blades of said at least two hinges and the outside layers being glued to each side of said intermediate layer at 90-degree bias, so that each sheath is completely enclosed within said panel.

11. The device described in claim 1, further comprising matting material with a high ultraviolet resistance rating to cover the top surface of said top panel.

12. The device described in claim 1, further comprising at least one additional slidable panel to provide screen coverage for tall windshields.

13. The device described in claim 1, further comprising side panels mounted on the bottom side of each pivotable panel, so that they can be extended outwardly to cover lateral windshields when said device is in its open position.

14. The device described in claim 2, further comprising a fixed bottom panel attached to said top plate of the bottom component of said at least two hinges to provide a rigid structure to support the device over the dashboard.

15. The device described in claim 2, wherein said fastening means for affixing the hinge to the front of said dashboard consists of fiber-loop fastening components cooperatively placed on said bottom panel and dashboard.

16. The device described in claim 1, further comprising at least one tab affixed to the back edge of said bottom panel for use in pulling it open from its sandwiched position.

17. The device described in claim 1, further comprising utility compartments in the space formed between said bottom panel and the top surface of said dashboard as a result of the installation of said device when said dashboard is not uniformly flat, said utility compartments providing space for incorporating accessory features.

18. A method for protecting the interior of a vehicle from damage caused by sun light exposure, comprising the following steps:
 (a) providing a top panel shaped to conform to the top geometry of the vehicle's dashboard;
 (b) providing hinge means for pivotally fastening said top panel to said dashboard, said top panel having a closed position wherein it rests substantially horizontally on said dashboard and having an open position wherein it rests upright against the windshield of the vehicle;
 (c) providing track means positioned below said top panel and extending outwardly with respect to said top panel and said dashboard;
 (d) providing one bottom panel shaped substantially like said top panel, wherein said bottom panel is sandwiched between said top panel and said dashboard in its closed position and is slidably attached to said track means so that it can extend outwardly and upwardly when said top panel is pivoted to its open position, wherein the back edge of said bottom panel features an opening to accommodate the post of the rear-view mirror typically protruding inward from the upper portion of the windshield, and wherein at least one tab is affixed to the back edge of said bottom panel for use in pulling it open from its sandwiched position;
 (d) pulling on said at least one tab to pivot said bottom panel into a substantially vertical position and to extend said bottom panel to cover said windshield; and
 (e) securing said bottom panel in its upward position by sliding said opening into said rear-view mirror post.

19. The method described in claim 18, wherein said panels are constructed with resin material to conform to the shape of the dashboard.

* * * * *